United States Patent [19]
McBreen

[11] 3,876,470
[45] Apr. 8, 1975

[54] ZINC PLATE SHAPE CHANGE INHIBITION

[75] Inventor: James McBreen, Pleasant Ridge, Mich.

[73] Assignee: General Motors Corporation, Detroit, Mich.

[22] Filed: Nov. 29, 1972

[21] Appl. No.: 310,254

[52] U.S. Cl. .................................................. 136/30
[51] Int. Cl. .......................................... H01m 41/00
[58] Field of Search........................ 136/30, 31, 125

[56] References Cited
UNITED STATES PATENTS

| | | | |
|---|---|---|---|
| 2,903,497 | 9/1959 | Comanor | 136/30 |
| 3,132,053 | 5/1964 | Krebs | 136/125 |
| 3,359,136 | 12/1967 | Merten et al. | 136/30 |
| 3,505,115 | 4/1970 | McBreen | 136/30 |
| 3,516,862 | 6/1970 | Van der Grinten | 136/30 |
| 3,671,319 | 6/1972 | Arrance | 136/30 |
| 3,703,414 | 11/1972 | Swatko | 136/30 |

Primary Examiner—John H. Mack
Assistant Examiner—C. F. Lefevour
Attorney, Agent, or Firm—Lawrence B. Plant

[57] ABSTRACT

A secondary zinc electrochemical cell including a low-hydrogen-overvoltage, plating-efficiency depressant at the edges of the zinc electrode to reduce the plating efficiency of zinc at the edges during charge and thereby forestall zinc electrode shape changes on cycling. In one embodiment, a porous frame saturated with $Fe(OH)_2$ is spaced from the edges of the zinc electrode by an electrolyte saturated felt.

4 Claims, 5 Drawing Figures

ZINC PLATE SHAPE CHANGE INHIBITION

This invention relates to secondary electrochemical cells having a zinc electrode as one member of the cells electrochemical couple. The invention is applicable to all secondary zinc cells regardless of the counter electrode i.e., AgO, Ni(OH)$_2$, Air, O$_2$, etc. Such cells conventionally use aqueous hydroxide (i.e., potassium hydroxide) electrolytes containing zinc oxide. The change in shape of the zinc electrode with cycling is one of the life-limiting factors of secondary zinc batteries. On cycling a secondary zinc cell, the zinc migrates from the top and sides of the zinc electrode to the bottom center thereof. This migration of zinc continues until the electrode's edges are depleted and its center thickened which results in a reduction in the capacity and useful life of the cell. In some cases, the increased zinc thickness at the center can cause rupture of the cell cases.

My observations indicate that one of the principal causes for shape change in zinc electrode is uneven current distribution during cycling. In this regard, there is a higher current density zone near the edges of the electrode than at its center during charging. This higher current density zone causes more zinc to form at the edges than in the center of the electrode and at the same time substantially reduces the concentration of the zincate ion from the electrolyte near the edge of the electrode. As a result, a concentration cell forms within the cell between the edges and the center of each zinc electrode which, at the end of charging, causes rapid depletion of the zinc from the edges and its build up in the center of the electrode. More specifically, once cycling of the zinc electrode has been begun, the zinc electrode will consist of a conductive support, sponge zinc and zinc oxide, while the ambient electrolyte will contain zincate ions. With the conductive support and presence of zinc in the electrode, the potential across the face of the electrode will be constant at all points thereon. If the concentration of zincate were constant throughout the electrolyte and no current were being passed, the potential of the electrode will be a constant irrespective of where the measurement is made on the surface of the electrode. If the concentration of zincate in the electrolyte differs from one point to another, a difference in potential (as measured by a reference electrode) will exist between points on the zinc electrode contacted by low and high zincate concentration portions of the electrolyte — hence a concentration cell. The amount of potential difference depends on the ratio of the zincate activities in the low and high zincate concentration regions of the electrolyte. When a concentration cell condition exists at the end of the charging cycle, zinc is deplated from the portion of the electrode contacting the low zincate electrolyte (i.e., the edges) and zinc plated on the electrode portion contacting the high zincate electrolyte (i.e., the center).

If a polarization-free electrolytic cell were to exist, the current distribution would depend principally on (1) the geometry of the electrodes (2) the shape and size of the electrolyte container, (3) the position of the electrodes with respect to the container walls and the top of the electrolyte, (4) the presence, position and shape of other conductive or non-conductive objects in the electrolyte and (5) the conductivity of the electrolyte. For example, if the anode and cathode are flat, rectangular, parallel plates, the most important factor in the current distribution is the edge effect, i.e., the current density is high at the edges of the plate. This edge effect is more pronounced in large containers and is greater when the distance between the anode and the cathode is increased or the resistance of the electrolyte increased. This type of current distribution is called primary current distribution. In reality, though, the electrode kinetics of the anode and cathode also affect the current distribution and when this is taken into consideration, the secondary or actual current distribution is obtained. The secondary current distribution is more uniform than the primary current distribution since the electrode kinetics tend to mitigate the affects of non uniform primary current distribution. The zinc distribution on the cathode is equal to the product of the actual or secondary current distribution and the cathodic current efficiency at the different current densities. Hence, if the plating occurs with 100% efficiency everywhere on the electrode, the metal distribution would correspond to the current distribution. On the other hand, if current efficiency decreases with increased current densities the metal distribution would be more even than the current distribution.

It is an object of the present invention to substantially equalize the metal distribution on a zinc electrode by reducing the plating efficiency of the zinc in the high current density edge portions of the electrode and thereby mitigate the effects of non-uniform current distribution and principally the affects of rapid exhaustion of the reducible zinc species, zincate, from the electrolyte near the edges of the zinc electrode.

This and other objects and advantages of this invention will become more apparent from the detailed description which follows which is described in conjunction with the several drawings in which.

Figure 1:
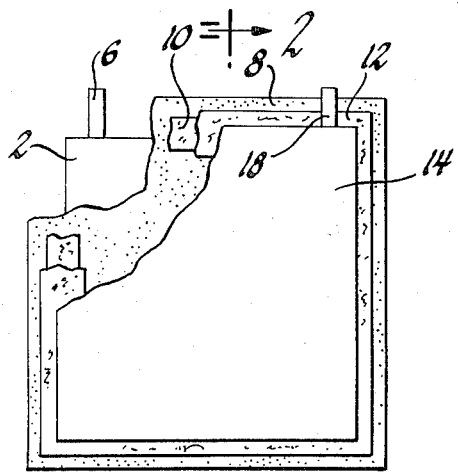
FIG. 1 is a partially broken away view depicting an anode-cathode cell couple according to this invention.

This invention comprehends reducing the plating efficiency of zinc near the edges of the zinc electrode by providing a low hydrogen overvoltage material near those edges. By providing a low hydrogen overvoltage material such as iron, cobalt, nickel, platinum, iridium, thorium, palladium, etc. near the edges of the electrode, water decomposition more readily occurs. Where water decomposition occurs, i.e., at the edges, the plating efficiency of the zinc during charge is lowered and the amount of zinc formed is reduced — hence the term plating efficiency depressant. The effect of this innovation is to reduce zincate depletion from the electrolyte due to high current density plating at the edges of the zinc electrode during charge, which, in turn, substantially avoids the creation of a concentration cell between the edges and center of the zinc electrode. Simply put, reduction of the plating efficiency at the edges of the zinc electrode delays the onset of shape change.

According to this invention, plating efficiency at the edges of the electrode is depressed by providing a low hydrogen overvoltage material between the counterelectrode and the edges of the zinc electrode. This material does not directly contact the zinc electrode, hence avoiding corrosion of the zinc therefrom. In a preferred embodiment, an absorbent material, such as a polyamide felt, forms a frame which overlays the edges of the zinc electrode. The frame is impregnated with a reducible species [(e.g., $Fe(OH)_2$] of a low-hydrogen-overvoltage, plating-efficiency depressant (e.g., Fe). The impregnated felt is spaced from the zinc electrode by a layer of like material which is wetted by the cell electrolyte. As charging progresses, zinc dendrites forming at the edges of the electrode grow through the electrolyte-saturated felt and contact the $Fe(OH)_2$ saturated felt causing a reduction of the $Fe(OH)_2$ to free iron (Fe) and the formation of zincate $[Zn(OH)_4^=]$ ion. At the end of charge then, any zinc which has contacted the low hydrogen overvoltage material has reverted to zincate and zinc oxide and no substantial depletion thereof occurs in the region of the low hydrogen overvoltage material.

The low hydrogen overvoltage material may be provided in place by a number of methods. For example, powdered iron, nickel, cobalt, etc. may be dispersed throughout a porous medium, such as the aforesaid mat. Likewise, a self-supporting network of low-hydrogen-overvoltage metal may be used. Examples of such materials would be electroformed or sintered porous metal bodies. The plating-efficiency depressant is preferably one which has a potential at least as noble as iron to insure no corrosion of the depressant during deep discharge of the zinc electrode. When, as in the preferred form, a porous absorbent mat is used to position and support the plating-efficiency depressant, the mat can comprise any of a number of materials which is inert to the cell environment. Included among such materials are polypropylene or polyamide felts, paper, asbestos, inorganic battery separator materials such as lanthanide oxide/hydroxide, cerous hydroxide, potassium titanate, etc. The low-hydrogen-overvoltage, plating-efficiency depressant is spaced from the edges of the zinc electrode, as by an electrolyte wetted separator which can conveniently comprise the same material as the mat/felt used to position/support the depressant.

In addition to the depressant and its spacing means from the zinc cathode, the positive electrode is separated from the cathode in the conventional manner using a tree-suppressing ion permeable membrane or separator such as are well known in the art. Examples of such known membranes/separators are cellulose compositions such as cellophane or fibrous sausage casings, as well as radiation grafted polyethylene, ceramics and inorganic separators, such as those marketed by Stanford Research Institute under the name Astropower Separators.

Figure 2:
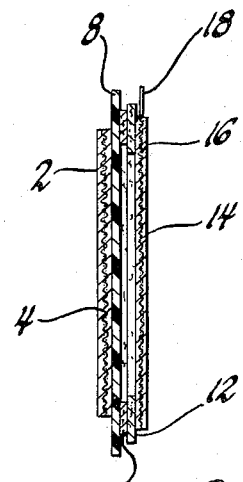
FIG. 2 is a sectioned side elevational view of the cell couple of FIG. 1 taken along the line 2—2.
Figure 3:
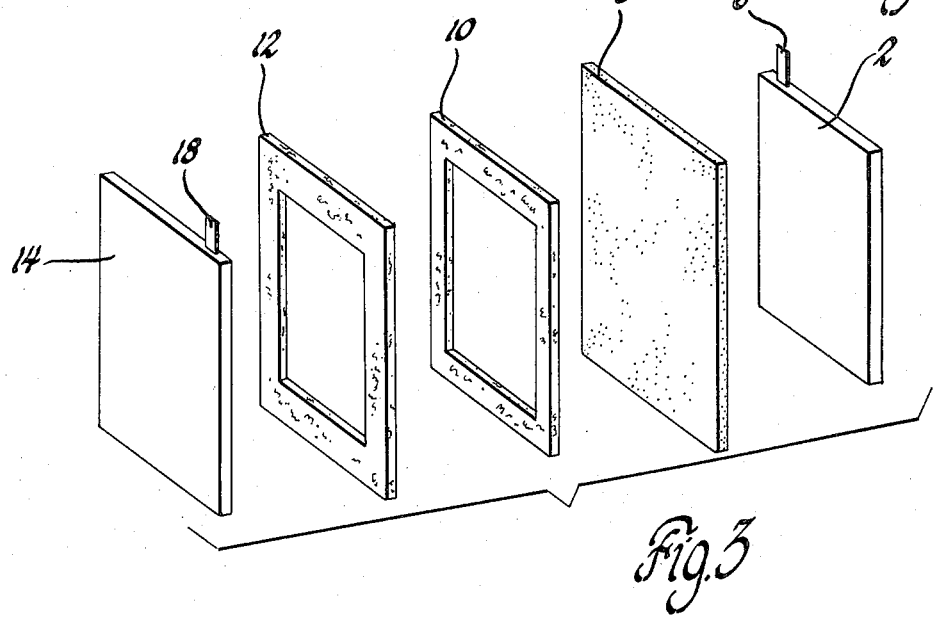
FIG. 3 is an exploded view of the elements comprising the cell couple of FIG. 1.

Referring now to the drawings, FIGS. 1, 2 and 3 show the relationship between the essential cell elements exclusive of the container means and electrolyte which are not shown. A positive electrode 2 comprises a conductive support or screen 4 holding the active material. A tab or lug 6 serves to connect the positive electrode to like electrodes in the same cell. Other types of counterelectrode may, of course, be used such as air or oxygen electrodes as are known in the art. An ion-permeable, tree-suppressing separator 8 prevents shorting of the positive and negative electrodes due to the formation of zinc trees or dendrites which would otherwise transverse the interelectrode space and directly contact the positive electrode. Such separators 8 have been discussed briefly above and are well known to those skilled in the art. Adjacent the ion permeable separator 8 is a porous frame 10 which overlies the edges of the zinc electrode 14 and contains a low-hydrogen-overvoltage zinc plating-efficiency depressant such as discussed above. The frame 10 need not conform to the entire edge defining the electrode 14. In this regard, the edge effect problem is not a major problem along the bottom of the zinc electrode and hence a depressant need not be positioned here. Hence, the frame 10 could resemble an inverted U and overlie only the top and side edges.

Between the low-hydrogen-overvoltage, plating-efficiency depressant in the frame 10 and the zinc electrode 14 there is provided a spacing means 12 which prevents direct contact between the low-hydrogen-overvoltage material and the zinc electrode 14. Were direct contact therebetween to occur, rapid corrosion of the zinc would result. As shown in FIG. 3 the spacing means 12 could comprise an envelope inclosing the zinc electrode 14. In this embodiment, the additional fabric provided by the spacing means 12 in the center of the electrode serves to fill the void space in the center of the frame 10 hence providing a tighter cell pack. As shown in FIG. 2 the spacing means 12 may also be frame-shaped, but preferably wider than the depressant frame 10. The zinc electrode 14 is conventional and comprises a paste of active material formed on a conductive metal screen 16. The conductive screen 16 ends in a tab 18 which is used to join several zinc electrodes together in a cell pack.

Figure 4:
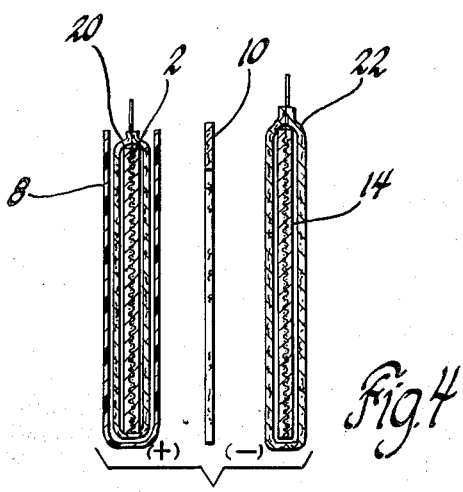
FIGS. 4 and 5 are sectioned side elevational views of other embodiments of this invention.

In the embodiment shown in FIG. 4, the positive electrode 2 is encapsulated in a porous felt material 20 similar to that forming the absorbant used in the frame 10 and spacing means 12. The felt 20 is heat sealed along its open edges to enclose the positive electrode 2 therein. A conventional ion permeable tree-suppressing separator 8 is then wrapped around the positive electrode 2. On the opposite side of the cell, the negative electrode 14 is also encapsulated in a felt 22 and is also heat sealed around the electrode. The felt 22 performs the same function as the frame 12 above in that it serves to isolate the low-hydrogen-overvoltage, plating-efficiency depressant in frame 10 from direct contact with the zinc electrode 14 A three-sided frame 10 of low hydrogen overvoltage material is positioned between the positive and negative electrode in the manner shown.

Figure 5:
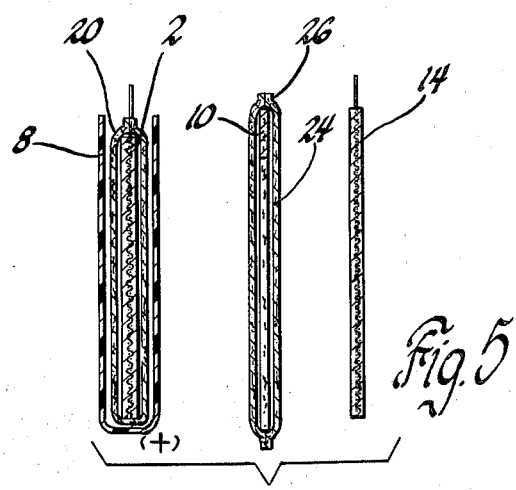

FIG. 5 is another variation of a cell made in accordance with this invention in which the positive electrode is encapsulated in the same manner as discussed in conjunction with FIG. 4. The zinc electrode 14 stands free and the frame 10 encapsulated in a felt envelope 24 which is heat sealed along the edges 26.

In one specific embodiment of this invention, a cell is fabricated using a nickel hydroxide positive electrode. Sintered carbonyl nickel plaques (0.09 cm thick) were cut into sheets 10.8 cm $\times$ 10.8 cm. The edges of the sheets and tab area were coined leaving a geometric area on the porous plaque of about 102 square centimeters. Two tabs, 1.2 cm. $\times$ 10 cm. were spot welded to the plaque. The plaques were then cleaned in an appropriate vapor degreaser. Active material was then applied to the plaque in the following manner. The plaques were vacuum impregnated with a solution comprising 4 molar nickel nitrate [$Ni(NO_3)_2$] and 5 percent by weight cobalt nitrate [$Co(NO_3)_2$]. The thusly prepared plaques were then cathodized at 32 amperes in a 25% KOH solution at 95°C. for 20 minutes to form electrode plates. After cathodization the plates were brushed with a nylon brush to remove loose particles and washed for four hours in deionized water. Following washing they were dried at 120°C. for 45 minutes. cient amount of active material, nickel hydroxide, which, in this case, amounted to about 12.5 grams. The plates were then wrapped in one turn of 0.005 in. thick porous felt comprising non-woven polyamide sold by the Pelon Corporation. They were next assembled with two cadium anodes in a cell case and wet down with a solution comprising 31% KOH and 8 grams per liter of LiOH. The positive electrodes were charged at 0.5 amperes for 16 hours and discharged at 1.0 amperes, followed by two other cycles at a charge current of 0.8 amps and a discharge of 1.0 amps. The electrodes were removed from the charging cell, washed for four hours in deionized water and dried at 60°C. for four hours. The electrode was next encapsulated in a 0.003 inch thick fibrous sausage casing provided by Union Carbine Food Products Division which formed the cell's separator. This was done in a manner such as shown in FIG. 5. In actual operation the sausage casing separator swells to about 0.0075 inch thick hence providing a tighter pack in the cell enclosure. A three-sided non-woven polyamide felt frame, such as 10 in FIG. 5, having outside dimensions of 4⅜ in. × 4⅜ in. square, ⅜ inch wide and 0.0025 inch thick is impregnated with a solution comprising 10 grams of $FeCl_2$ and 10 cc of water. The frame is dipped in this solution until saturated, removed and dipped in a 25% potassium hydroxide solution to precipitate iron hydroxide in the interstices of the felt. The thusly prepared felt is washed to remove any residual chloride ion and KOH. The thusly prepared frame is then sandwiched in a cell stack in the manner shown in FIG. 5 between two felt sheets 24 which are heat sealed together along their edges. The sheets 24 have a thickness of 0.0025 inch and are 4½ inches square.

The zinc electrode 14 comprises a silver screen identified as 5AG-15-1/0 provided by the Ex-met Corporation. The active material was prepared as follows. Seventeen millimeters of 60% Teflon T-30 emulsion was added to 150 cc of deionized water. This mixture was added to 300 grams of USP-12 pharmaceutical grade zinc oxide to form a stiff paste. The paste was then spread on a stainless steel tray to a depth of about one quarter of an inch. A thermo couple was placed in the mix and the tray was placed in an oven at 275°C. When the mix reached 275°C., which took about 50 minutes, the oven was shut off and the zinc oxide-Teflon mixture removed. The lumps were broken up and the mix was sieved through a 40 mesh screen. 0.5% by weight HgO was added to the sieved material and the powders thoroughly mixed. The zinc electrode was made by placing 18.7 grams of the Teflonated zinc oxide mix into an open paper wrap contained in a mold cavity. The paper was a 6¾ lb. paper supplied by the Aldine Paper Co. and identified as Aldex. The mix was uniformly distributed on the paper and the expanded metal grid placed within the mix. The mix and grid were then enclosed by folding over the paper wrap and the electrode pressed to the desired thickness.

The thusly formed cell components were snugly fit into a cell container and wet down with about 25 cc of a 37½ weight percent potassium hydroxide solution containing 6 grams of lithium hydroxide per liter and 60 grams per liter of zinc oxide. The thusly prepared cell was charged at one half ampere for 8 hours and discharged at the 1 amp rate to 1 volt. During discharge, the cell delivered 3.5 ampere-hours. The cell was then charged again at one half ampere for 7½ hours and placed on a cycling regimen comprising a 1 ampere discharge for 60 minutes followed by a 1 ampere charge for 63 minutes or until 2 volts are reached at the terminals, whichever comes first. At the time of this writing, the above identified cell has cycled 300 times and has demonstrated zinc electrode performance superior to that of a control cell made in the identical manner but without the $Fe(OH)_2^-$ impregnated frame between the positive and negative electrodes.

While I have disclosed my invention solely in terms of specific embodiments thereof, I do not intend to be limited thereto except to the extent hereinafter set forth in the claims which follow.

I claim:

1. In a secondary electrochemical cell comprising a zinc electrode having a face with central and edge portions, a counterelectrode substantially uniformly spaced from said zinc electrode face and an ion permeable, tree-suppressing membrane between the electrode and counterelectrode, said edge portions being subjected to higher charging current densities than said central portion, the improvement comprising a plating efficiency depressant selectively located in the high current density path between said edge portion and the counterelectrode and adjacent the high-current-density-subjected edge portion but not the lower-current-density-subjected center portion of said zinc electrode for substantially equalizing the plating rates at the edge and center portions regardless of current distribution across said face, and means for spacing said depressant from said edge portion, said depressant having a lower hydrogen overvoltage than zinc to reduce the plating efficiency of zinc at the edge portion below its plating efficiency at the central portion and to thereby forestall zinc electrode shape changes during cycling.

2. In a secondary electrochemical cell comprising a zinc electrode having a face with central and edge portions, a counterelectrode substantially uniformly spaced from said zinc electrode face and an ion permeable, tree-suppressing membrane between the electrode and counterelectrode, said edge portions being subjected to higher charging current densities than said central portion, the improvement comprising a plating efficiency depressant selectively located in the high current density path between said edge portion and the counterelectrode and adjacent the high-current-density-subjected edge portion but not the lower-current-density-subjected center portion of said zinc electrode face for substantially equalizing the plating rates at the edge and center portions regardless of the current distribution across said face, and means for spacing said depressant from said edge portion, said depressant having a lower hydrogen overvoltage than zinc and a potential at least as noble as iron to reduce the plating efficiency of zinc at the edge portion below its plating efficiency at the central portion and to thereby forestall zinc electrode shape changes during cycling and to reduce the effects of corrosion on said depressant.

3. In a secondary electrochemical cell comprising a zinc electrode having a face with central and edge portions, a counterelectrode substantially uniformly spaced from said zinc electrode face and an ion permeable, tree-suppressing membrane between the electrode and counterelectrode, said edge portions being subjected to higher charging current densities than said central portion, the improvement comprising a frame-like absorbent first mat selectively located in the high current density path between said edge portion and the counterelectrode and adjacent the high-current-density-subjected edge portion but not the lower-current-density-subjected center of said face and an electrolyte-saturated second mat spacing said first mat from said edge portion, said first mat being impregnated with a zinc-reducible compound of a plating efficiency depressant having a lower-hydrogen overvoltage than zinc and which upon contact with zinc forms said depressant in said second mat to reduce the plating efficiency of zinc at the edge portion below its plating efficiency at the central portion to thereby forestall zinc electrode shape changes during cycling by substantially equalizing the plating rates at the edge and center portions regardless of the current distribution across said face.

4. In a secondary electrochemical cell comprising a zinc electrode having a face with central and edge portions, a counterelectrode substantially uniformly spaced from said zinc electrode face and an ion permeable, tree-suppressing membrane between the said electrode and counterelectrode, said edge portions being subjected to higher charging current densities than said central portion, the improvement comprising a frame-like absorbent first mat selectively located in the high current density path between the edge portion and the counter-electrode and adjacent near the high-currentdensity-subjected edge portion but not the lower-current-density-subjected center portion of said face and an electrolyte-saturated second mat spacing the first mat from said edge portion, said first mat being impregnated with ferrous hydroxide.

* * * * *

UNITED STATES PATENT OFFICE
CERTIFICATE OF CORRECTION

PATENT NO. : 3,876,470
DATED : April 8, 1975
INVENTOR(S) : James McBreen

It is certified that error appears in the above-identified patent and that said Letters Patent are hereby corrected as shown below:

Column 5, line 6 before "cient" insert -- This process was repeated 9 times to build up a suffi --;

Column 8, line 14 between "current" and "density" insert -- - --.

Signed and Sealed this twenty-fourth Day of February 1976

[SEAL]

Attest:

RUTH C. MASON
Attesting Officer

C. MARSHALL DANN
Commissioner of Patents and Trademarks